(12) United States Patent
Kwon et al.

(10) Patent No.: US 9,666,869 B2
(45) Date of Patent: May 30, 2017

(54) BATTERY CELL OF IRREGULAR STRUCTURE

(71) Applicant: LG CHEM, LTD., Seoul (KR)

(72) Inventors: Sungjin Kwon, Daejeon (KR); Dong-Myung Kim, Daejeon (KR); Kiwoong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/440,734

(22) PCT Filed: Feb. 11, 2014

(86) PCT No.: PCT/KR2014/001102
§ 371 (c)(1),
(2) Date: May 5, 2015

(87) PCT Pub. No.: WO2014/126369
PCT Pub. Date: Aug. 21, 2014

(65) Prior Publication Data
US 2015/0340700 A1    Nov. 26, 2015

(30) Foreign Application Priority Data

Feb. 13, 2013 (KR) .................... 10-2013-0015372

(51) Int. Cl.
*H01M 2/02* (2006.01)
*H01M 10/0525* (2010.01)
(Continued)

(52) U.S. Cl.
CPC .......... *H01M 4/70* (2013.01); *H01M 2/0212* (2013.01); *H01M 2/266* (2013.01);
(Continued)

(58) Field of Classification Search
CPC ......... H01M 10/0445; H01M 10/058–10/0587
See application file for complete search history.

(56) References Cited

U.S. PATENT DOCUMENTS 6,224,995 B1 *  5/2001  Fauteux ............. H01M 4/0442
                                                29/623.1
2001/0005561 A1 * 6/2001 Yamada ............. H01M 2/1066
                                                429/152
(Continued)

FOREIGN PATENT DOCUMENTS

JP    2000-30670 A    1/2000
JP    2007-18917 A    1/2007
(Continued)

OTHER PUBLICATIONS

International Search Report, issued in PCT/KR2014/001102, dated Jun. 18, 2014.

*Primary Examiner* — Jonathan Crepeau
*Assistant Examiner* — Jacob Buchanan
(74) *Attorney, Agent, or Firm* — Birch, Stewart, Kolasch & Birch, LLP

(57) ABSTRACT

Disclosed herein is a battery cell configured to have a structure in which an electrode assembly, including positive electrodes, negative electrodes, and separators disposed respectively between the positive electrodes and the negative electrodes, is mounted in a battery case, wherein the electrode assembly is provided at one and/or the other of opposite surfaces thereof adjacent to electrode terminals, among outer surfaces thereof, with a depression having an outwardly increasing size.

19 Claims, 6 Drawing Sheets

(51) Int. Cl.
*H01M 10/0585* (2010.01)
*H01M 4/70* (2006.01)
*H01M 2/26* (2006.01)
*H01M 10/052* (2010.01)
*H01M 10/04* (2006.01)
*H01M 2/06* (2006.01)
*H01M 10/0565* (2010.01)
*H01M 4/02* (2006.01)

(52) U.S. Cl.
CPC ... *H01M 10/0413* (2013.01); *H01M 10/0436* (2013.01); *H01M 10/052* (2013.01); *H01M 10/0525* (2013.01); *H01M 10/0585* (2013.01); *H01M 10/0565* (2013.01); *H01M 2004/021* (2013.01); *Y02T 10/7011* (2013.01)

(56) References Cited

U.S. PATENT DOCUMENTS

| | | |
|---|---|---|
| 2003/0099885 A1 | 5/2003 | Kim et al. |
| 2010/0047685 A1 | 2/2010 | Lee et al. |
| 2011/0183183 A1* | 7/2011 | Grady .................. H01M 2/1022 429/152 |
| 2011/0287308 A1* | 11/2011 | Kim ......................... B29C 43/18 429/176 |
| 2012/0015236 A1 | 1/2012 | Spare |
| 2012/0115020 A1 | 5/2012 | Hwang |
| 2014/0113184 A1* | 4/2014 | Hamel .............. H01M 10/0436 429/179 |

FOREIGN PATENT DOCUMENTS

| | | |
|---|---|---|
| JP | 2008-293771 A | 12/2008 |
| JP | 2010-27368 A | 2/2010 |
| JP | 2011-113667 A | 6/2011 |
| JP | 2013-101829 A | 5/2013 |
| JP | 2013-518394 A | 5/2013 |
| KR | 1999-0058899 A | 7/1999 |
| KR | 2002-0065293 A | 8/2002 |
| KR | 10-2008-0110469 A | 10/2009 |
| KR | 10-2012-0047824 A | 5/2012 |

* cited by examiner

BATTERY CELL OF IRREGULAR STRUCTURE

TECHNICAL FIELD

The present invention relates to a battery cell of an irregular structure, and more particularly to a battery cell configured to have a structure in which an electrode assembly, including positive electrodes, negative electrodes, and separators disposed respectively between the positive electrodes and the negative electrodes, is mounted in a battery case, wherein the electrode assembly is provided at one and/or the other of opposite surfaces thereof adjacent to electrode terminals, among outer surfaces thereof, with a depression having an outwardly increasing size.

BACKGROUND ART

Based on the appearance thereof, a lithium secondary battery may be generally classified as a cylindrical battery, a prismatic battery, or a pouch-shaped battery. Based on the type of an electrolyte, a lithium secondary battery may be also classified as a lithium ion battery, a lithium ion polymer battery, or a lithium polymer battery.

A recent trend in the miniaturization of mobile devices has increased the demand for a prismatic battery or a pouch-shaped battery, which has a small thickness. In particular, much interest is currently focused on such a pouch-shaped battery because it is easy to modify the shape of the pouch-shaped battery, the manufacturing cost of the pouch-shaped battery is low, and the pouch-shaped battery is lightweight.

In general, a pouch-shaped battery is a battery having an electrode assembly and an electrolyte in a pouch-shaped battery case, made of a laminate sheet including a resin layer and a metal layer, in a sealed state. The electrode assembly mounted in the battery case may be configured to have a jelly-roll (wound) type structure, a stacked type structure, or a combination (stacked/folded) type structure.

FIG. 1 is a view typically showing the structure of a pouch-shaped secondary battery including a stacked type electrode assembly.

Referring to FIG. 1, a pouch-shaped secondary battery 10 includes an electrode assembly 30, electrode tabs 40 and 50 extending from the electrode assembly 30, electrode leads 60 and 70 welded to the electrode tabs 40 and 50, and a battery case 20, in which the electrode assembly 30 is mounted.

The electrode assembly 30 is a power generating element configured to have a structure in which positive electrodes and negative electrodes are sequentially stacked in a state in which separators are disposed respectively between the positive electrodes and the negative electrodes. The electrode assembly 30 is configured to have a stacked type structure or a stacked/folded type structure. The electrode tabs 40 and 50 extend from electrode plates of the electrode assembly 30. The electrode leads 60 and 70 are electrically connected to the electrode tabs 40 and 50 extending from the respective electrode plates, for example, by welding. The electrode leads 60 and 70 are partially exposed outward from the battery case 20. In addition, insulative films 80 are partially attached to the top and bottom of each of the electrode leads 60 and 70 to improve sealing between the electrode leads 60 and 70 and the battery case 20 and, in addition, to improve an electrically insulative state.

The battery case 20 is made of an aluminum laminate sheet. The battery case 20 provides a space in which the electrode assembly 30 is mounted. The battery case 20 is generally configured to have a pouch shape. In the stacked type electrode assembly 30 as shown in FIG. 1, the inner upper end of the battery case 20 is spaced apart from the electrode assembly 30 such that the positive electrode tabs 40 and the negative electrode tabs 50 can be coupled to the electrode leads 60 and 70, respectively.

In recent years, however, a new type of battery cell has been required in accordance with a trend change for a slim type design or various other designs.

In addition, the above-mentioned battery cell may be configured to include electrode assemblies having the same size or the same capacity. For this reason, in order to manufacture a battery cell having a new structure in consideration of the design of a device, to which the battery cell is applied, it may be necessary to reduce the capacity of the battery cell or modify the design of the device such that the size of the device is increased.

In order to solve the above-mentioned problems, battery cells having different sizes are stacked to a battery pack, which is disclosed in some prior arts. However, the battery pack is configured to have a structure in which the battery cells are stacked. For this reason, electrochemical reaction does not occur between the stacked battery cells. As a result, the thickness of the battery pack may be increased, and the capacity of the battery pack may be reduced due to the increased thickness of the battery pack In addition, electrical connection may be complicated during modification of the design of the battery cell with the result that it may be difficult to manufacture a battery cell satisfying desired conditions.

Therefore, there is a high necessity for an electrode assembly applicable depending upon the shape of a device, to which a battery cell is applied, and a battery cell including the same.

DISCLOSURE

Technical Problem

The present invention has been made to solve the above problems and other technical problems that have yet to be resolved.

Specifically, it is an object of the present invention to provide a battery cell configured to have a structure in which the battery cell can be mounted in various shapes and spaces of a device, whereby it is possible to maximally utilize an internal space of the device, and the battery cell can be efficiently mounted in various external structures of the device in addition to a rectangular external structure of the device.

Technical Solution

In accordance with one aspect of the present invention, the above and other objects can be accomplished by the provision of a battery cell configured to have a structure in which an electrode assembly, including positive electrodes, negative electrodes, and separators disposed respectively between the positive electrodes and the negative electrodes, is mounted in a battery case, wherein the electrode assembly is provided at one and/or the other of opposite surfaces thereof adjacent to electrode terminals, among outer surfaces thereof, with a depression having an outwardly increasing size.

In the battery cell according to the present invention, the electrode assembly is provided at an outer surface thereof with a depression having a specific structure. Consequently, it is possible to apply the battery cell to a device having a curved or protruding structure. In addition, it is possible to manufacture battery cells having various capacities and sizes based on the above-described specific structure, whereby it is possible to maximally utilize an internal space of the device.

In this specification, the "opposite surfaces of the electrode assembly adjacent to the electrode terminals" means, in a case in which the electrode assembly has a hexahedral structure, and the electrode terminals are formed at one surface of the electrode assembly, surfaces of the electrode assembly opposite to each other while being adjacent to one surface of the electrode assembly. For example, in a case in which the electrode assembly has a rectangular parallelepiped structure, and the electrode terminals are formed at one surface of the electrode assembly having a relatively small width, the opposite surfaces of the electrode assembly may be front and back surfaces of the electrode assembly having the largest area while being adjacent to one surface of the electrode assembly.

In a concrete example, the electrode assembly may include two or more electrode groups, each including a first electrode, a separator, and a second electrode which are sequentially stacked, the electrode groups being stacked in a state in which a separator is disposed between the electrode groups, and at least one of the electrode groups may be provided with an opening necessary to form the depression. Specifically, the electrode assembly may include a basic electrode group having no opening and one or more bored electrode groups each having an opening, the basic electrode group and the bored electrode groups being stacked. More specifically, the electrode assembly may include a basic electrode group and two or more bored electrode groups, and the bored electrode groups may be stacked on the basic electrode group in order in which the size of the openings is increased.

The size of the openings may be decided based on the size of a maximum inner diameter passing through the center of each of the openings, and each of the bored electrode groups may have an opening equivalent to 5 to 80% the area of one surface of the basic electrode group.

The shape of the openings of the bored electrode groups may be selected in consideration of a corresponding shape of a device. For example, the openings of the bored electrode groups may have a circular planar shape, an oval planar shape, or a polygonal planar shape. However, the present invention is not limited thereto.

Arrangement of the openings of the bored electrode groups is not particularly restricted. For example, in a case in which the bored electrode groups have openings of the same shape, the bored electrode groups may be stacked such that central axes of the openings are aligned with each other.

According to circumstances, the bored electrode groups may be stacked such that central axes of the openings are tilted with respect to a vertical through axis of the electrode assembly or one-side inner ends of the openings are aligned with each other.

In another concrete example, the bored electrode groups may have openings of various shapes. Specifically, at least two of the bored electrode groups may have openings of different shapes.

Based on the stacking method of the bored electrode groups and the shape of the openings, therefore, the depression may have various shapes. For example, the openings may have the same shape, and in an arrangement in which the central axes of the openings are aligned with each other, the depression may have a gradient in which an increase in size of the depression is uniform in an outward direction.

In addition, the depression may have a gradient in which an increase in size of the depression is gradually increased in the outward direction or a gradient in which an increase in size of the depression is gradually decreased in the outward direction.

In a case in which the depression has various structures as described above, it is possible to flexibly apply the battery cell to a corresponding shape of a device. In addition, it is possible to reduce an internal space of the device by the size of the depression and to further diversify the design of the device.

In a concrete example, the battery case may easily correspond to the shape of the electrode assembly having the depression. Specifically, the battery case may be formed of a laminate sheet including a resin layer and a metal layer or a metal can. However, the present invention is not limited thereto.

Consequently, the battery case formed of the laminate sheet or the metal can may have an electrode assembly receiving unit deformable so as to correspond to the depression of the electrode assembly such that the depression is formed at the battery cell.

The external shape of the battery case may be formed using various methods. For example, the electrode assembly having the stacked electrodes according to the present invention may be mounted in the receiving unit of the battery case, and then vacuum may be applied into the receiving unit such that the receiving unit shrinks and thus the battery case is deformed so as to correspond to the external shape of the electrode assembly.

In another example, a die (punch) corresponding to the shape of the depression of the electrode assembly may be pressed onto the upper end of the electrode assembly having the depression to deform the battery case.

That is, the electrode assembly is configured to have a structure including electrodes having openings and a depression formed by the stacked electrodes. When the electrode assembly is mounted in the receiving unit of the battery case, and then vacuum is applied into the receiving unit or pressure is applied onto the receiving unit, the battery case shrinks and is deformed so as to correspond to the external shape of the electrode assembly.

The above-described methods may solve a problem that it is necessary to manufacture a new battery case whenever the design of the electrode assembly is changed and, in addition, restrain a phenomenon in which stress concentrates locally on the battery case.

The battery cell may be a lithium ion battery cell or a lithium ion polymer battery cell. However, the present invention is not limited thereto.

In general, a lithium secondary battery includes a positive electrode, a negative electrode, a separator, and a non-aqueous electrolytic solution containing lithium salt.

The positive electrode may be manufactured, for example, by applying a mixture of a positive electrode active material, a conductive agent, and a binder to a positive electrode current collector and drying the applied mixture. A filler may be further added to the mixture as needed.

The positive electrode active material may be, but is not limited to, a layered compound, such as a lithium cobalt oxide ($LiCoO_2$) or a lithium nickel oxide ($LiNiO_2$), or a compound replaced by one or more transition metals; a lithium manganese oxide represented by a chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by a chemical formula $LiNi_{1-x}M_xO_2$ (where M=Co, Mn, Al, Cu, Fe, Mg, B, or Ga, and x=0.01 to 0.3); a lithium manganese composite oxide represented by a chemical formula $LiMn_{2-x}M_xO_2$ (where M=Co, Ni, Fe, Cr, Zn, or Ta, and x=0.01 to 0.1) or a chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 30 weight % based on the total weight of the compound including the positive electrode active material. The conductive agent is not particularly restricted so long as the conductive agent exhibits high conductivity while the conductive agent does not induce any chemical change in the battery to which it is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive agent.

The binder is a component assisting in binding between the active material and conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler so long as it does not cause chemical changes in the battery to which it is applied and is made of a fibrous material. As examples of the filler, there may be used olefin polymers, such as polyethylene and polypropylene; and fibrous materials, such as glass fiber and carbon fiber.

On the other hand, the negative electrode is prepared by applying and drying a negative electrode active material to a negative electrode current collector. The above-described components may be selectively added to the negative electrode active material as needed.

As the negative electrode active material, for example, there may be used carbon, such as non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \leq x \leq 1$; $1 \leq y \leq 3$; $1 \leq z \leq 8$); lithium metal; lithium alloy; silicon-based alloy; tin-based alloy; metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer, such as polyacetylene; or a Li—Co—Ni based material.

The separator is disposed between the positive electrode and the negative electrode. As the separator, for example, an insulative thin film exhibiting high ion permeability and high mechanical strength may be used. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In a case in which a solid electrolyte, such as polymer, is used as an electrolyte, the solid electrolyte may function as the separator.

The non-aqueous electrolytic solution containing lithium salt is composed of a polar organic electrolytic solution and lithium salt. As the electrolytic solution, a non-aqueous liquid electrolytic solution, organic solid electrolyte, or inorganic solid electrolyte may be used.

As examples of the non-aqueous liquid electrolytic solution, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiClO_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature storage characteristics, the non-aqueous electrolytic solution may further include carbon dioxide gas.

In accordance with another aspect of the present invention, there is provided a device including the battery cell with the above-stated construction as a power source. The device may be selected from among a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage device.

In accordance with a further aspect of the present invention, there is provided a battery pack including two or more battery cells with the above-stated construction as unit cells. That is, there is provided a battery pack configured to have a structure in which two or more battery cells as unit cells are connected in series and/or parallel to each other. The battery pack may be used in a device, such as a mobile phone, a portable computer, a smart phone, a tablet PC, a smart pad, a netbook computer, a light electronic vehicle (LEV), an electric vehicle, a hybrid electric vehicle, a plug-in hybrid electric vehicle, or a power storage device.

The structure of the device and a method of manufacturing the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
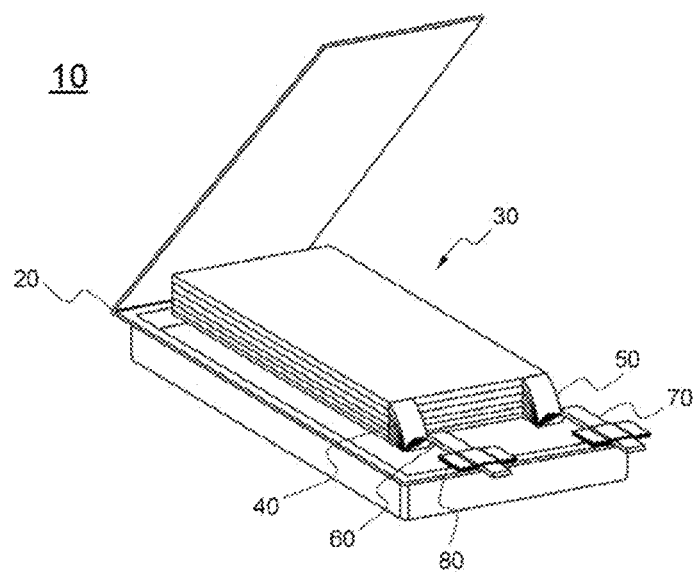
FIG. 1 is a typical view showing a conventional battery cell.
Figure 2:
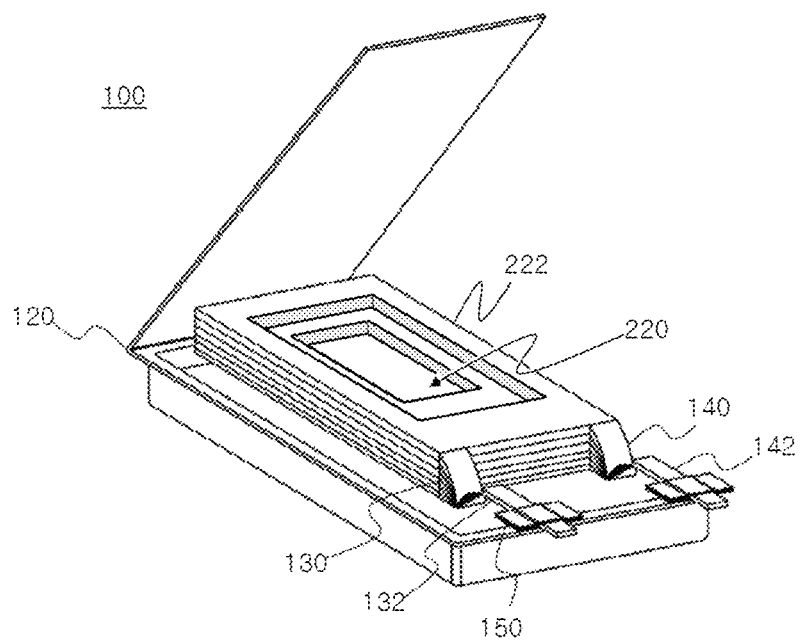
FIG. 2 is a typical view showing a battery cell including an electrode assembly having a depression according to the present invention.

FIG. 2 is a typical view showing the structure of a battery cell including an electrode assembly having a depression according to the present invention.

Referring to FIG. 2, a battery cell 100 is configured to have a structure in which an electrode assembly 222 having a depression 220, the size of which is increased outward, is mounted in a pouch-shaped battery case 120 in a sealed state such that two electrode leads 132 and 142 electrically connected to positive electrode and negative electrode tabs 130 and 140 of the electrode assembly 222 are exposed outward.

Figure 3:
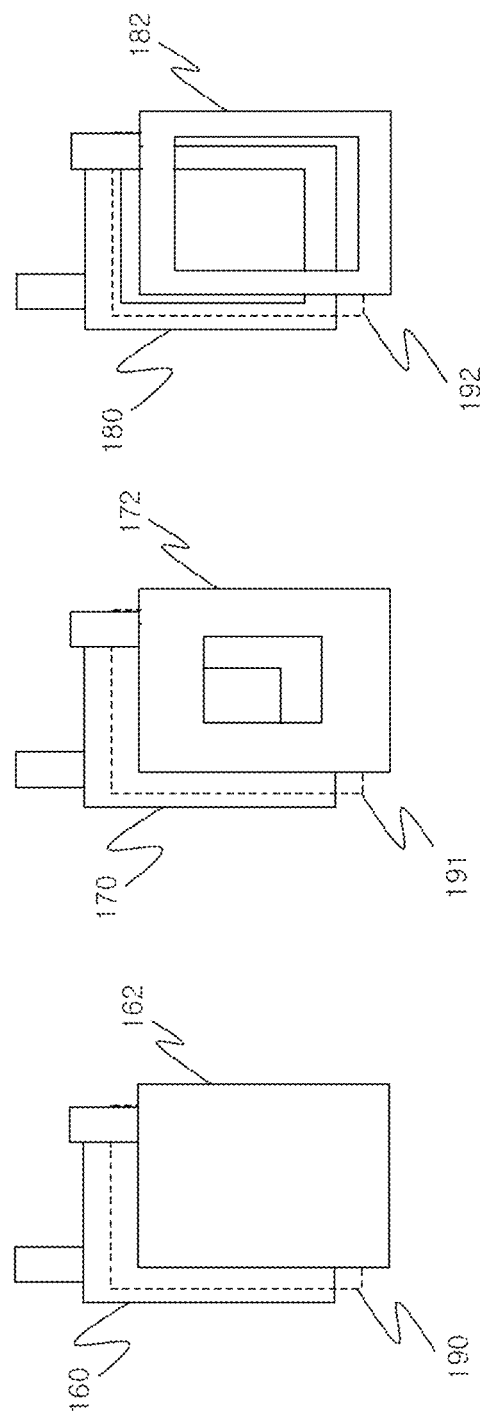
FIG. 3 is a typical view showing electrode groups according to an embodiment of the present invention.
Figure 4:
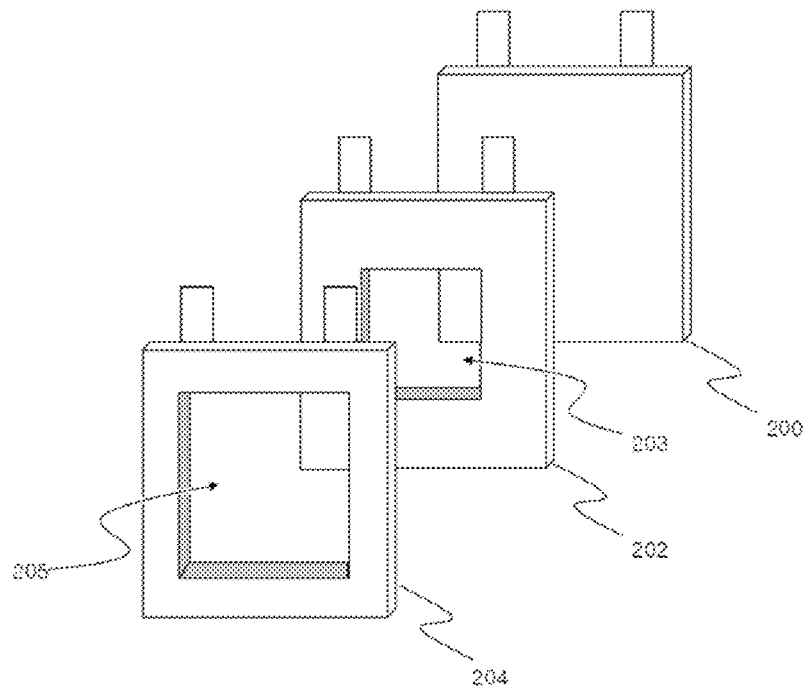
FIG. 4 is a typical view showing stacking of the electrode groups.

FIG. 3 is a plan view showing electrode groups according to an embodiment of the present invention, and FIG. 4 is a typical view showing stacking of the electrode groups.

Referring to these figures, a basic electrode group 200 is configured to have a structure in which a separator 190 is disposed between a first electrode 160 and a second electrode 162. A first bored electrode group 202 is configured to have a structure in which openings 203 having the same size are bored in a first electrode 170 and a second electrode 172, and a separator 191 is disposed between the first electrode 170 and the second electrode 172. A second bored electrode group 204 is configured to have a structure in which openings 205 having a size greater than that of the openings 203 of the first bored electrode group 202 are bored in a first electrode 180 and a second electrode 182, and a separator 192 is disposed between the first electrode 180 and the second electrode 182. The first bored electrode group 202 and the second bored electrode group 204 are sequentially stacked on the basic electrode group 200 such that the size of the openings 203 and 205 is increased in a stacked direction. Specifically, the first bored electrode group 202 is stacked on the top of the basic electrode group 200 in a state in which a separator is disposed between the first bored electrode group 202 and the basic electrode group 200, and the second bored electrode group 204 is stacked on the top of the first bored electrode group 202 in a state in which a separator is disposed between the second bored electrode group 204 and the first bored electrode group 202.

Figure 5:
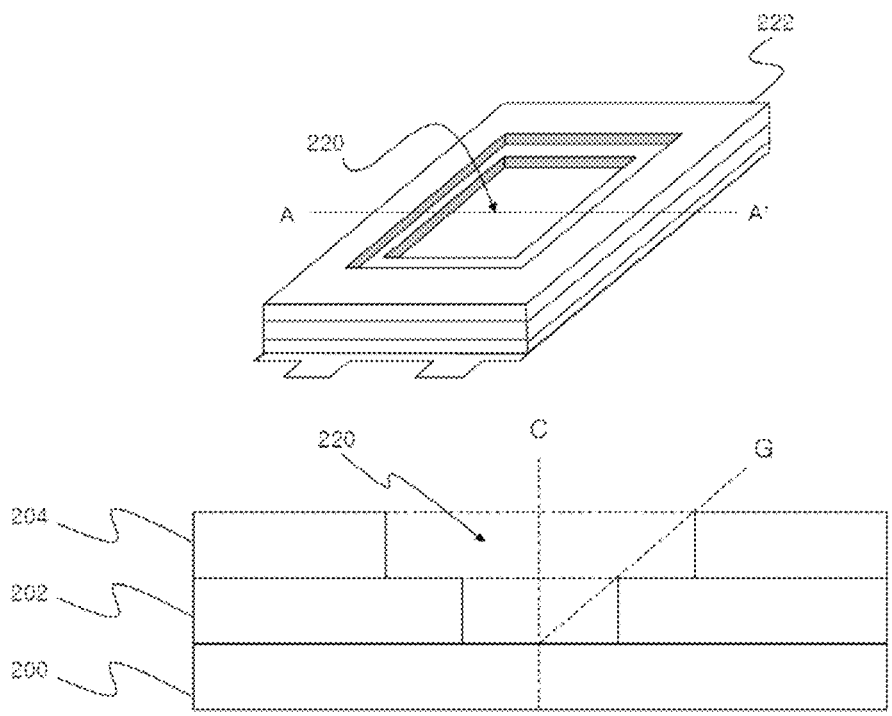
FIG. 5 is a typical view showing an electrode assembly according to an embodiment of the present invention with a cross sectional view of the electrode assembly taken along A-A'.

FIG. 5 is a typical view showing an electrode assembly according to an embodiment of the present invention with a cross sectional view of the electrode assembly taken along A-A'.

Referring to FIG. 5, an electrode assembly 222 is configured to have a structure in which a first bored electrode group 202 and a second bored electrode group 204 are stacked such that central axes of openings having the same shape of the first bored electrode group 202 and the second bored electrode group 204 are aligned with a vertical through axis C of the electrode assembly to form a depression 220, and the depression 220 has a gradient G in which the size of the depression 220 is increased at a uniform ratio in an outward direction of the electrode assembly 222 as the first bored electrode group 202 and the second bored electrode group 204 are stacked in order in which the size of the depression 220 is increased.

Figure 6:
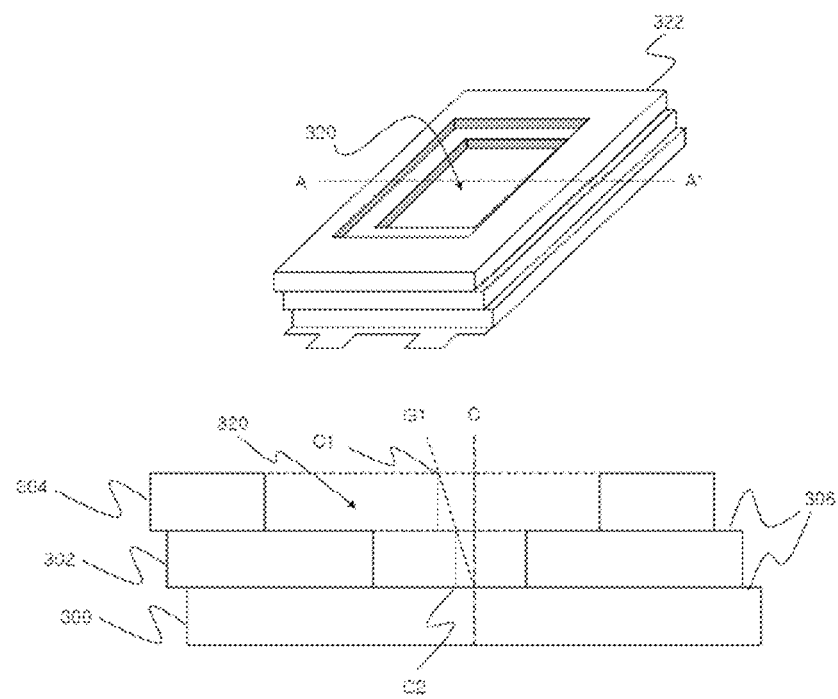
FIG. 6 is a typical view showing an electrode assembly according to another embodiment of the present invention with a cross sectional view of the electrode assembly taken along A-A'.

FIG. 6 is a typical view showing an electrode assembly according to another embodiment of the present invention with a cross sectional view of the electrode assembly taken along A-A'.

Referring to FIG. 6, an electrode assembly 322 is configured to have a structure in which a first bored electrode group 302 and a second bored electrode group 304 are stacked such that central axes C1 and C2 of openings having the same shape of the first bored electrode group 302 and the second bored electrode group 304 are tilted with respect to a vertical through axis C of the electrode assembly at a uniform gradient G1, and steps 306 having the same tilt as the gradient G1 are formed at opposite sides of the outside of the electrode assembly.

Figure 7:
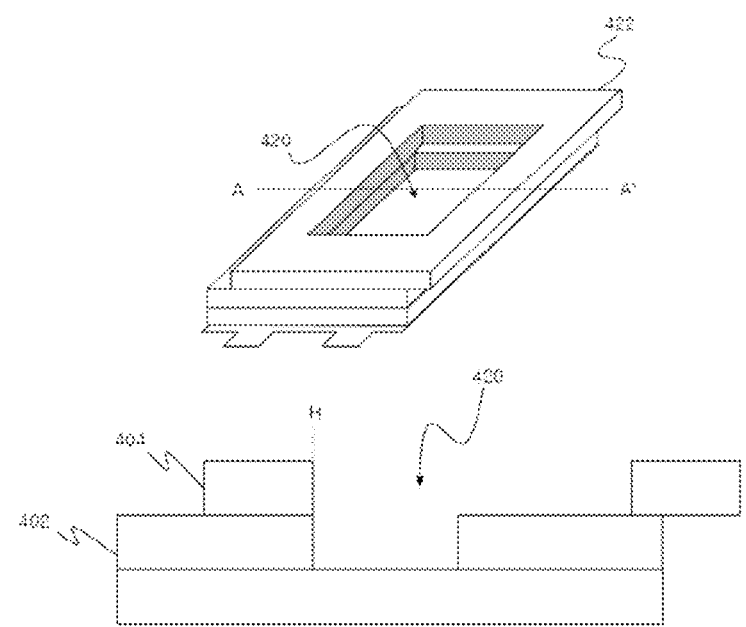
FIG. 7 is a typical view showing an electrode assembly according to another embodiment of the present invention with a cross sectional view of the electrode assembly taken along A-A'.

FIG. 7 is a typical view showing an electrode assembly according to another embodiment of the present invention with a cross sectional view of the electrode assembly taken along A-A'.

Referring to FIG. 7, an electrode assembly 422 is configured to have a structure in which a first bored electrode group 402 and a second bored electrode group 404 are stacked such that one-side inner ends of openings having the same shape of the first bored electrode group 402 and the second bored electrode group 404 are aligned with each other on the basis of a vertical through axis H of the electrode assembly.

Figure 8:
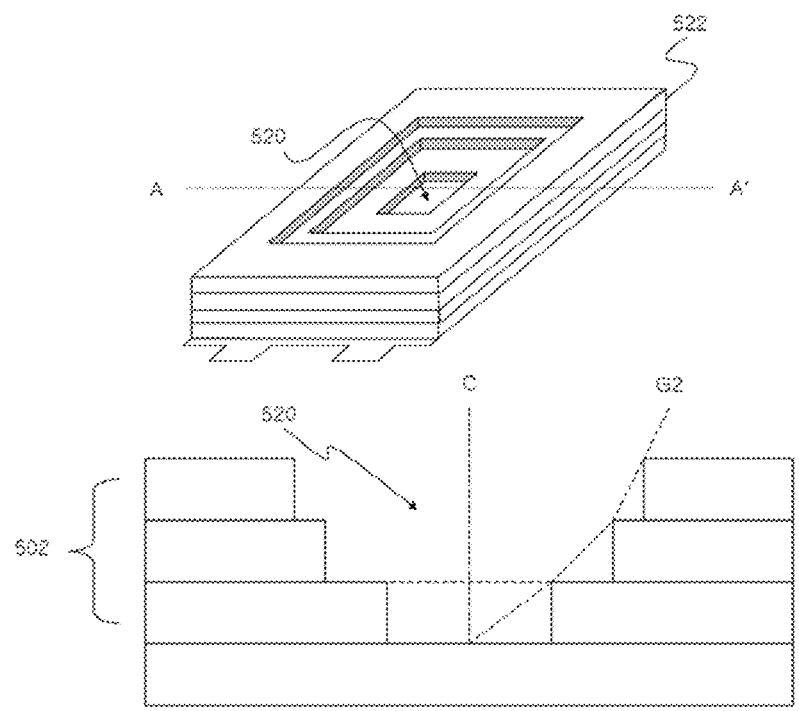
FIG. 8 is a typical view showing an electrode assembly according to another embodiment of the present invention with a cross sectional view of the electrode assembly taken along A-A'.

FIG. 8 is a typical view showing an electrode assembly according to another embodiment of the present invention with a cross sectional view of the electrode assembly taken along A-A'.

Referring to FIG. 8, an electrode assembly 522 is configured to have a structure in which bored electrode groups 502 are stacked such that central axes of openings of the bored electrode groups 502 are aligned with a vertical through axis C of the electrode assembly to form a depression 520, and the depression 520 has a gradient G2 in which the increase in size of the depression 520 is gradually decreased in an outward direction of the electrode assembly 522 as the bored electrode groups 502 are stacked in order in which the size of the depression 520 is increased.

Figure 9:
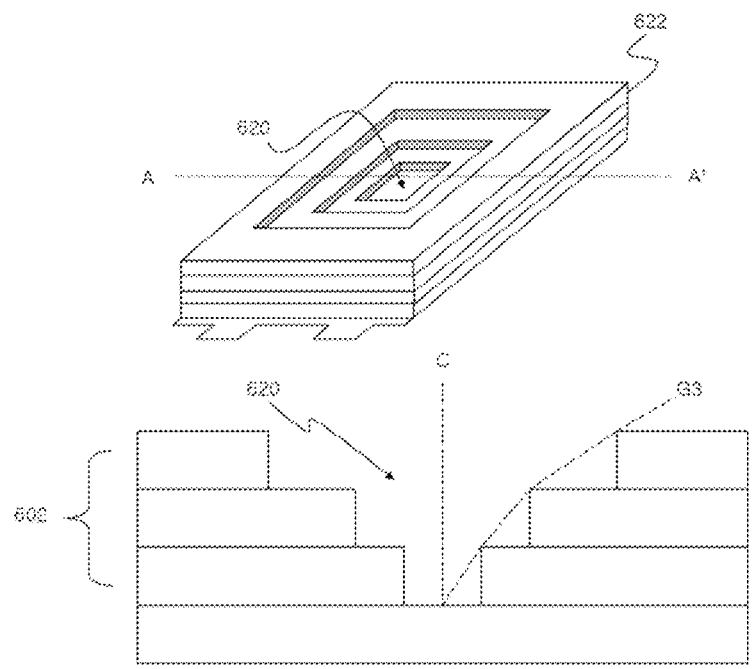
FIG. 9 is a typical view showing an electrode assembly according to another embodiment of the present invention with a cross sectional view of the electrode assembly taken along A-A'.

FIG. 9 is a typical view showing an electrode assembly according to another embodiment of the present invention with a cross sectional view of the electrode assembly taken along A-A'.

Referring to FIG. 9, an electrode assembly 622 is configured to have a structure in which bored electrode groups 602 are stacked such that central axes of openings of the bored electrode groups 602 are aligned with a vertical through axis C of the electrode assembly to form a depression 620, and the depression 620 has a gradient G3 in which the increase in size of the depression 620 is gradually increased in an outward direction of the electrode assembly 622 as the bored electrode groups 602 are stacked in order in which the size of the depression 620 is increased.

Figure 10:
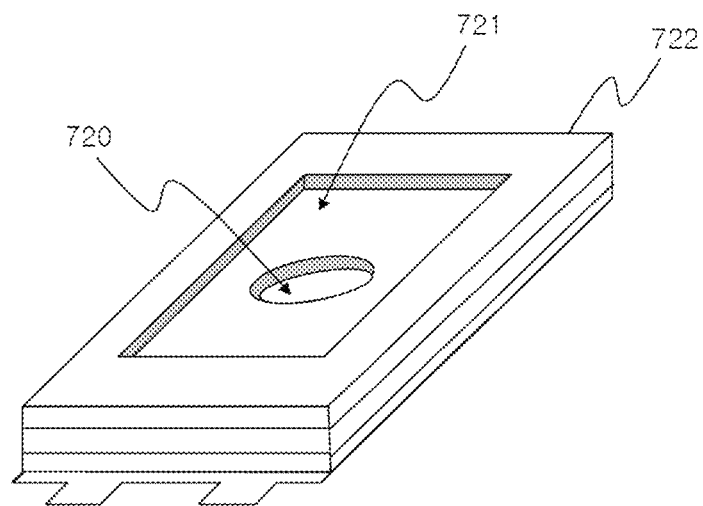
FIG. 10 is a typical view showing an electrode assembly according to a further embodiment of the present invention.

FIG. 10 is a typical view showing an electrode assembly according to a further embodiment of the present invention.

Referring to FIG. 10, an electrode assembly 722 is configured to have a structure in which a bored electrode group having a circular opening 720 and another bored electrode group having a polygonal opening 721 are stacked.

As can be seen from FIGS. 2 to 10, the battery cell according to the present invention may have a depression of various sizes. Consequently, the battery cell may be easily mounted even in a space of a device in which it is difficult to mount a conventional battery cell, and a battery cell having a larger capacity may be mounted even in a limited space of the device according to the internal structure of the device. Consequently, it is possible to maximally utilize an internal space of the device.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery cell according to the present invention has a depression, the size of which is increased outward, whereby it is possible to apply the battery cell to various shapes of a device. In addition, it is possible to easily secure a battery cell installation space in the device, thereby maximally utilizing an internal space of the device. Furthermore, it is possible to mount a battery cell having a high capacity in the device, thereby further miniaturizing the device.

The invention claimed is:

1. A battery cell comprising:
   an electrode assembly mounted in a battery case, the electrode assembly comprising positive electrodes, negative electrodes, and separators disposed respectively between the positive electrodes and the negative electrodes, and
   a depression formed in an exterior surface of the electrode assembly, the depression having an outwardly increasing size from a bottom to a top of the depression,
   wherein the depression is surrounded by the exterior surface of the electrode assembly, and
   wherein the electrode assembly comprises two or more electrode groups, each comprising a first electrode, a separator, and a second electrode which are sequentially stacked, and at least one of the electrode groups has an aperture to form the depression.

2. The battery cell according to claim 1, wherein the electrode assembly comprises a basic electrode group having no aperture and one or more bored electrode groups each having an aperture, the basic electrode group and the bored electrode groups being stacked.

3. The battery cell according to claim 2, wherein the electrode assembly comprises a basic electrode group and two or more bored electrode groups, and the bored electrode groups are stacked on the basic electrode group in order in which a size of the apertures is increased.

4. The battery cell according to claim 2, wherein the apertures of the bored electrode groups have a circular planar shape, an oval planar shape, or a polygonal planar shape.

5. The battery cell according to claim 3, wherein the bored electrode groups have apertures of the same shape and are stacked such that central axes of the apertures are aligned with each other.

6. The battery cell according to claim 3, wherein the bored electrode groups have apertures of the same shape and are stacked such that central axes of the apertures are tilted with respect to a vertical through axis of the electrode assembly.

7. The battery cell according to claim 3, wherein the bored electrode groups have apertures of the same shape and are stacked such that one-side inner ends of the apertures are aligned with each other.

8. The battery cell according to claim 3, wherein at least two of the bored electrode groups have apertures of different shapes.

9. The battery cell according to claim 3, wherein the size of the apertures is decided based on a size of a maximum inner diameter passing through a center of each of the apertures.

10. The battery cell according to claim 3, wherein the bored electrode groups each have an aperture equivalent to 5% to 80% an area of one surface of the basic electrode group.

11. The battery cell according to claim 1, wherein the depression has a gradient in which an increase in size of the depression is uniform in an outward direction.

12. The battery cell according to claim 1, wherein the depression has a gradient in which an increase in size of the depression is gradually increased in an outward direction.

13. The battery cell according to claim 1, wherein the depression has a gradient in which an increase in size of the depression is gradually decreased in an outward direction.

14. The battery cell according to claim 1, wherein the battery case is formed of a laminate sheet comprising a resin layer and a metal layer or a metal can.

15. The battery cell according to claim 1, wherein the battery case has an electrode assembly receiving unit deformable so as to correspond to the depression of the electrode assembly.

16. The battery cell according to claim 1, wherein the battery cell is a lithium ion battery cell or a lithium ion polymer battery cell.

17. A battery pack comprising two or more battery cells according to claim 1 as unit cells.

18. A device comprising a battery pack according to claim 17 as a power source.

19. The device according to claim 18, wherein the device is selected from a group consisting of a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage device.

* * * * *